No. 739,689. PATENTED SEPT. 22, 1903.
M. LEVESON.
INSECT TRAP.
APPLICATION FILED MAY 16, 1903.
NO MODEL.
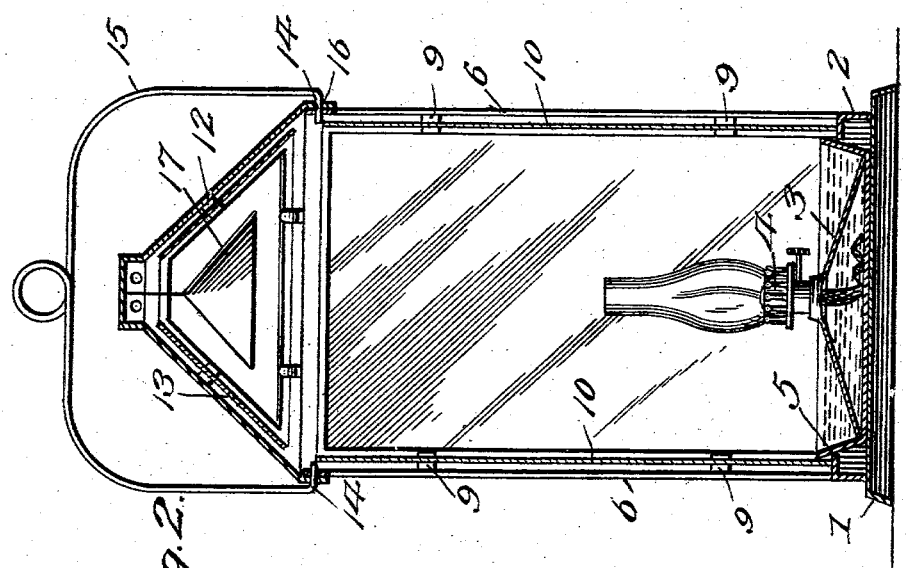
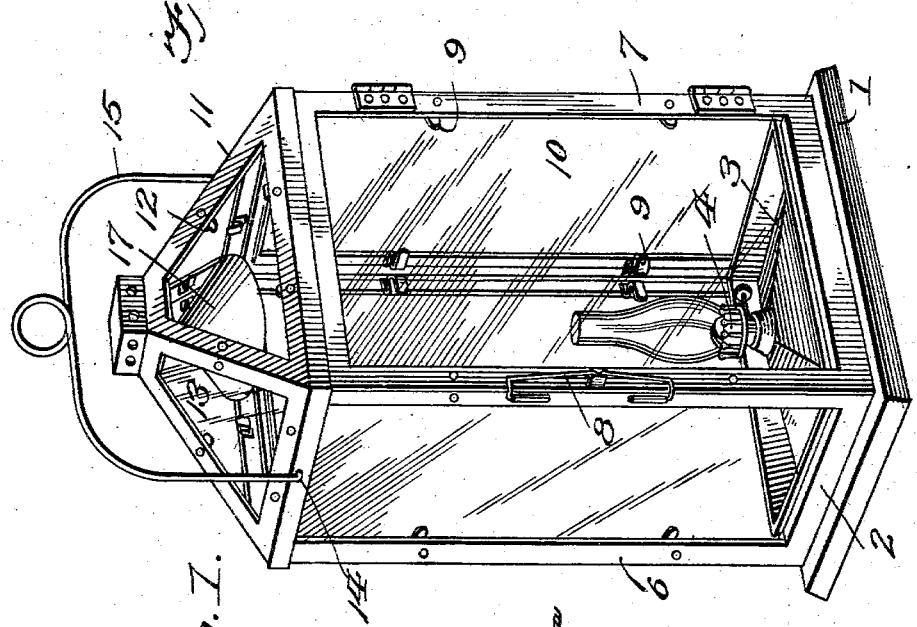
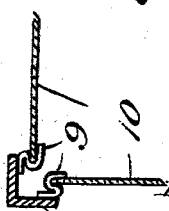
Witnesses
Geo. Ackman Jr.
Herbert D. Lawson
Inventor
Max Leveson,
By Victor J. Evans
Attorney No. 739,689. Patented September 22, 1903.

UNITED STATES PATENT OFFICE.

MAX LEVESON, OF SCOTLAND, SOUTH DAKOTA.

INSECT-TRAP.

SPECIFICATION forming part of Letters Patent No. 739,689, dated September 22, 1903.

Application filed May 16, 1903. Serial No. 157,463. (No model.)

*To all whom it may concern:*

Be it known that I, MAX LEVESON, a citizen of the United States, residing at Scotland, in the county of Bonhomme and State of South Dakota, have invented new and useful Improvements in Insect-Traps, of which the following is a specification.

My invention relates to new and useful improvements in insect-traps, and its object is to provide a device of that character employing a lamp for the purpose of attracting insects.

One of the objects of the invention is to mount glass panels about the lamp in such a manner as to permit the insects to readily enter the trap, but which will practically prevent them from leaving the same.

The invention consists in providing a base upon which is mounted a suitable lamp surrounded by a tank containing a suitable liquid. Frames are mounted upon the base, and each of these frames has clips upon its inner surface, which serve to hold the glass panels in rear of the frame, but removed therefrom, so as to form passages through which insects may enter the device. One of the frames is hinged so as to form a door, and the cover of the trap is formed of frames which are provided with glass panels, also forming passages for the insects.

The invention also consists in the further novel construction and combination of parts hereinafter more fully described and claimed, and illustrated in the accompanying drawings, showing the preferred form of my invention, and in which—

Figure 1 is a perspective view of my improved insect-trap. Fig. 2 is a vertical section therethrough, and Fig. 3 is a horizontal section through a portion of the trap and showing a passage formed between one of its frames and its glass panel.

Referring to the figures by numerals of reference, 1 is a preferably rectangular base having flanges 2 thereon, between which is arranged a reservoir 3 of a lamp 4. A tray 5 incloses the reservoir and is adapted to contain any suitable liquid, such as oil and water. Secured to three of the flanges 2 are rectangular frames 6, and to the edge of one of these frames is hinged a fourth frame 7, which serves the purposes of a door and is held normally in closed position by means of a spring-catch 8. This door is arranged over the fourth flange on the base 1. On the inner face of each frame 6 and 7 are a suitable number of S-shaped arms 9, into which are inserted glass panels 10. These arms serve to hold the panels in rear of their respective frames, thereby forming passages between the edges thereof, through which insects may pass into the trap. Arranged upon the frames is a pyramidal cover 11, the sides of which are cut away, and secured to the inner faces of these sides are S-shaped arms 12, similar to the arms 9, hereinbefore described, and which serve to hold glass panels 13 back of but removed from the sides of the cover, so as to form passages therebetween. The cover is adapted to overlap the upper ends of the frames 6 and is secured thereto by means of inwardly-turned arms 14, which are formed at the ends of a bail 15 and extend through apertures 16, formed in the opposite sides of the cover and in the upper ends of the two side frames 6. A smoke-bell 17 is preferably arranged within the cover, so as to protect the panels 13 from injury by the lamp.

To use the trap herein described, the lamp is first lighted and is then suspended at a suitable point by means of the bail 15. Insects will be attracted by the light and will fly thereto and alight upon the glass panels 10 and 13. They will then crawl through the passages formed between the panels and their frames and will thus reach the interior of the trap. The heat of the lamp will cause the insects to fall into the liquid contained within the tray 5. The panels 10 can be readily removed by springing the ends of the bail 15 outward, so as to detach the cover. The panels can then be slid upward from the arms 9.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. A device of the character described, comprising a base, frames thereon, arms extending from the rear faces of the frames, transparent panels engaged by the arms and held spaced from the frames, whereby passages are formed between the frames and panels, a cover extending over and secured to the frames, and an illuminating device inclosed by the panels.

2. In a device of the character described, the combination with a base; of frames thereon, arms extending from the rear faces of the frames, transparent panels engaged thereby, said panels being held spaced from the frames and forming passages therebetween, an illuminating device between the panels, a tray surrounding the illuminating device, a cover, and a bail connected to the cover and adapted to secure the same upon the frames.

In testimony whereof I affix my signature in presence of two witnesses.

MAX LEVESON.

Witnesses:
A. E. PARMENTER,
T. J. SEDLACEK.